(12) United States Patent
Kobayashi et al.

(10) Patent No.: US 12,381,243 B2
(45) Date of Patent: Aug. 5, 2025

(54) LAMINATE, GASKET, AND FUEL CELL

(71) Applicant: DIC Corporation, Tokyo (JP)

(72) Inventors: Hiroki Kobayashi, Tokyo (JP); Tatsuya Kouyama, Tokyo (JP)

(73) Assignee: DIC CORPORATION, Tokyo (JP)

( * ) Notice: Subject to any disclaimer, the term of this patent is extended or adjusted under 35 U.S.C. 154(b) by 549 days.

(21) Appl. No.: 17/880,845

(22) Filed: Aug. 4, 2022

(65) Prior Publication Data

US 2023/0046897 A1   Feb. 16, 2023

(30) Foreign Application Priority Data

Aug. 5, 2021 (JP) ................................ 2021-128884

(51) Int. Cl.
| | |
|---|---|
| *H01M 8/1004* | (2016.01) |
| *H01M 8/0273* | (2016.01) |
| *H01M 8/242* | (2016.01) |
| *H01M 8/10* | (2016.01) |

(52) U.S. Cl.
CPC ....... *H01M 8/1004* (2013.01); *H01M 8/0273* (2013.01); *H01M 8/242* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 2013/0059072 A1* | 3/2013 | Wang | C09J 175/06 427/407.1 |
| 2024/0313235 A1* | 9/2024 | Kondou | H01M 8/10 |

FOREIGN PATENT DOCUMENTS

JP        2007-66768 A      3/2007

* cited by examiner

*Primary Examiner* — Alix E Eggerding
(74) *Attorney, Agent, or Firm* — WHDA, LLP

(57) ABSTRACT

The present invention provides: a laminate for a gasket of a fuel cell, the laminate including a heat seal layer, having excellent moisture and heat resistance, and being suitable for a gasket of a fuel cell; a gasket; a membrane electrode junction including the gasket; and a fuel cell. A laminate includes a base material and a heat seal layer arranged on the base material. The heat seal layer is a reaction product of a heat sealant containing an amorphous polyester polyol (A), an epoxy resin (B), and an isocyanate compound (C). The amorphous polyester polyol (A) is a reaction product of a polyvalent carboxylic acid and a polyhydric alcohol. An amount of aromatic polyvalent carboxylic acid in the polyvalent carboxylic acid is 95% by mass or more. A glass transition temperature of the amorphous polyester polyol (A) is −20° C. or more and 40° C. or less.

12 Claims, 1 Drawing Sheet

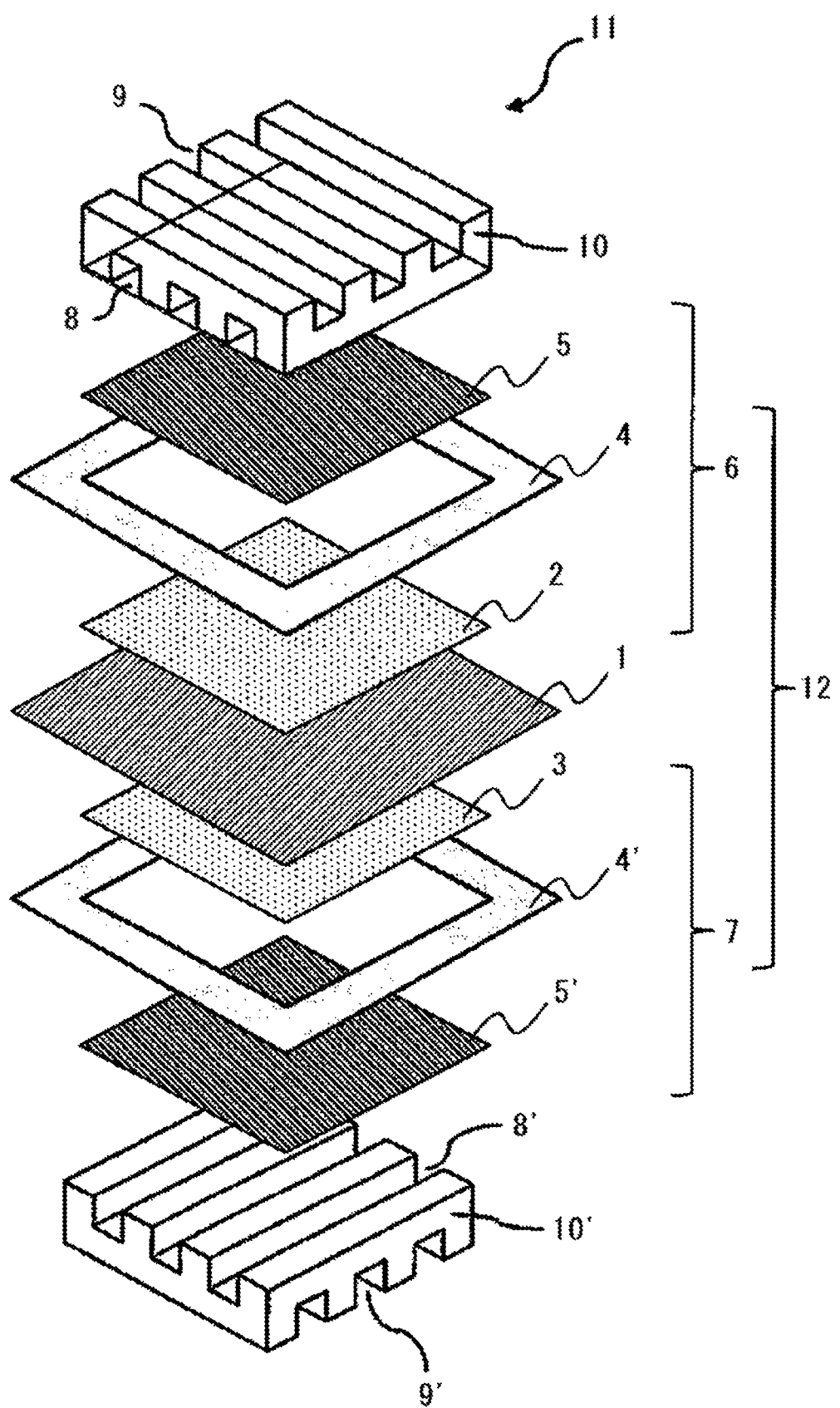

LAMINATE, GASKET, AND FUEL CELL

BACKGROUND OF THE INVENTION

1. Field of the Invention

The present invention relates to a laminate, a gasket, a membrane electrode junction, and a fuel cell.

2. Description of the Related Art

In recent years, fuel cells have attracted attention as a solution to environmental and energy problems. In a reaction in which a reducing gas such as hydrogen or methane is oxidized by an oxidizing gas such as oxygen or air, fuel cells convert the associated chemical energy into electrical energy to obtain electricity. Such energy is considered a clean energy due to the abundance of materials that can be used as raw materials and the fact that the only emission from power generation is water.

Fuel cells are classified according to the type of electrolyte, such as alkaline, phosphoric acid, polymer, molten carbonate, and solid oxide. Among them, the polymer electrolyte fuel cells (PEFCs) are expected to be used as portable power sources, home power sources, and in-vehicle power sources because of their low-temperature operation, high power density, and small size and weight. The polymer electrolyte fuel cell has a polymer electrolyte membrane with a fuel electrode (anode catalyst layer) on one side and an air electrode (cathode catalyst layer) on the other side, which is called a membrane electrode junction.

During power generation, fuel gas containing hydrogen is supplied to the fuel electrode side and oxidant gas containing oxygen to the air electrode side. The supplied fuel gas is converted into protons and electrons at the anode catalyst layer (also called fuel electrode catalyst layer or simply electrode catalyst layer or catalyst layer). Protons move through the polymer electrolyte and polymer electrolyte membrane in the anode catalyst layer to the cathode catalyst layer (also called air electrode catalyst layer, or simply electrocatalyst layer, or catalyst layer) side. Electrons move through the external circuit to the cathode catalyst layer as well. In the cathode catalyst layer, protons, electrons, and externally supplied oxidant gas react to produce water. As described above, chemical reactions occur at the fuel and air electrodes, generating an electrical charge and functioning as a battery.

In general, membrane electrode junctions have a gasket member outside the catalyst layer on the electrolyte membrane to prevent gas leakage caused by the difference in thickness between the area where the catalyst layer is formed on the electrolyte membrane and the area where it is not formed, and intensive degradation in the area where the catalyst layer is not formed. The gasket member can be joined to the electrolyte membrane by a heat sealant (Patent Document 1).

[Patent Document 1] Japanese Patent Laid-open No. 2007-66768

SUMMARY OF THE INVENTION

In a fuel cell, hydrogen and oxygen react with exotherm to produce additional water. Therefore, the heat sealant that joins the gasket member to the electrolyte membrane must be capable of withstanding high temperature and humidity. That is, an object of this application is to provide: a laminate for a gasket of a fuel cell, the laminate including a heat seal layer, having excellent moisture and heat resistance, and being suitable for a gasket of a fuel cell; a gasket; a membrane electrode junction including the gasket; and a fuel cell.

The present invention relates to a laminate including a base material and a heat seal layer arranged on the base material. The heat seal layer is a reaction product of a heat sealant containing an amorphous polyester polyol (A), an epoxy resin (B), and an isocyanate compound (C). The amorphous polyester polyol (A) is a reaction product of a polyvalent carboxylic acid and a polyhydric alcohol. The amount of aromatic polyvalent carboxylic acid in the polyvalent carboxylic acid is 95% by mass or more. The glass transition temperature of the amorphous polyester polyol (A) is −20° C. or more and 40° C. or less.

The present invention can provide: a laminate for a gasket of a fuel cell, the laminate including a heat seal layer, having excellent moisture and heat resistance, and being suitable for a gasket of a fuel cell; a gasket; a membrane electrode junction including the gasket; and a fuel cell.

BRIEF DESCRIPTION OF DRAWING

FIG. 1 is a schematic view of an example of a configuration of a solid polymer electrolyte fuel cell.

DETAILED DESCRIPTION OF EMBODIMENTS

<Laminate>

(Base Material)

The present invention has a base material and a heat seal layer arranged on the base material. As a base material, a film that does not easily deform under pressure is preferred, assuming that the base material will be used as a gasket in a fuel cell. Examples thereof include films made of polyethylene terephthalate, polyethylene naphthalate, polycarbonate, polyamide, polyimide, silicone rubber, and fluoroelastomer. These may be used singly or in a laminate of two or more types. The film thickness of the base material is 10 µm or more and 200 µm or less as an example, and is set to an appropriate value in consideration of the thickness of the catalyst layer and diffusion layer to be described later.

(Heat Seal Layer)

The heat seal layer is provided on the substrate and is a reaction product coating of a heat sealant containing an amorphous polyester polyol (A), epoxy resin (B), and isocyanate compound (C).

Amorphous polyester polyol (A) is a reaction product of polyvalent carboxylic acid and polyhydric alcohol, and the amount of aromatic polyvalent carboxylic acid blended in polyvalent carboxylic acid is 95% by mass or more, and the glass transition temperature is −20° C. or more and 40° C. or less.

The glass transition temperature in this application refers to the value measured as follows.

Using a differential scanning calorimeter (DSC-7000 manufactured by SII NanoTechnology Inc., hereinafter referred to as DSC), 5 mg of a sample is heated from room temperature to 200° C. at 10° C./min under a nitrogen gas flow at 30 mL/min, and then cooled to −80° C. at 10° C./min. The temperature is again increased to 150° C. at 10° C./min and the DSC curve is measured. The intersection of the straight line extending the baseline on the low temperature side to the high temperature side in the measurement results observed in the second temperature raising process and the tangent line drawn at the point where the slope of the curve in the step-like portion of glass transition is maximum is the glass transition point. The temperature in this case is the glass transition temperature. The temperature is raised to 200° C. in the first temperature raising process, but this may be the temperature at which polyester polyol (A) melts sufficiently, and if 200° C. is not sufficient, adjustment is performed accordingly. Similarly, the cooling temperature may be adjusted accordingly if −80° C. is not sufficient (e.g., if the glass transition temperature is lower).

Whether the polyester polyol is amorphous is determined by whether a clear crystallization peak or crystal melting peak is observed in the cooling process and second temperature raising process in the above measurement method. Since polyester polyol (A) used in the present invention is amorphous, no clear crystallization or crystal melting peaks are observed.

Examples of aromatic polycarboxylic acids used in the synthesis of polyester polyol (A) include aromatic polybasic acids such as orthophthalic acid, terephthalic acid, isophthalic acid, phthalic anhydride, 1,4-naphthalenedicarboxylic acid, 2,5-naphthalenedicarboxylic acid, 2,6-naphthalenedicarboxylic acid, 2,3-naphthalenedicarboxylic acid anhydride, naphthalic acid, trimellitic acid, trimellitic anhydride, pyromellitic acid, pyromellitic anhydride, biphenyldicarboxylic acid, 1,2-bis(phenoxy)ethane-p,p'-dicarboxylic acid, benzophenone tetracarboxylic acid, benzophenone tetracarboxylic acid dianhydride, 5-sodium sulfoisophthalic acid, tetrachlorophthalic anhydride, and tetrabromophthalic anhydride; and methyl esters of aromatic polybasic acids such as dimethyl terephthalic acid and dimethyl 2,6-naphthalenedicarboxylic acid, and one or two or more can be used in combination.

Terephthalic acid and isophthalic acid are preferably used. From the viewpoint of reducing the crystallinity of polyester polyol (A), it is preferable that the amount of terephthalic acid blended is 60% by mass or less and the amount of isophthalic acid blended is 40% by mass or more and 100% by mass or less in the polyvalent carboxylic acids used in the synthesis.

Polyvalent carboxylic acids that can be used with aromatic polyvalent carboxylic acids include aliphatic polybasic acids such as malonic acid, ethyl malonic acid, dimethyl malonic acid, succinic acid, 2,2-dimethylsuccinic acid, succinic anhydride, alkenyl succinic anhydrides, glutaric acid, adipic acid, pimelic acid, suberic acid, azelaic acid, sebacic acid, fumaric acid, maleic acid, maleic anhydride, and itaconic acid;
  alkyl esterified products of aliphatic polybasic acids such as dimethyl malonate, diethyl malonate, dimethyl succinate, dimethyl glutarate, dimethyl adipate, diethyl pimelic acid, diethyl sebacate, dimethyl fumarate, diethyl fumarate, dimethyl maleate, and diethyl maleate; and
  alicyclic polybasic acids such as 1,1-cyclopentane dicarboxylic acid, 1,2-cyclopentane dicarboxylic acid, 1,3-cyclopentane dicarboxylic acid, 1,2-cyclohexanedicarboxylic acid, 1,3-cyclohexanedicarboxylic acid, 1,4-cyclohexanedicarboxylic acid, tetrahydrophthalic anhydride, 4-methylhexahydrophthalic anhydride, hexahydrophthalic anhydride, cyclohexane-1,2,4-tricarboxylic acid-1,2-anhydride, himic anhydride, and het acid anhydride.

Examples of polyhydric alcohols used in the synthesis of polyester polyol (A) include aliphatic diols such as ethylene glycol, diethylene glycol, propylene glycol, 1,3-propanediol, 1,2,2-trimethyl-1,3-propanediol, 2,2-dimethyl-3-isopropyl-1,3-propanediol, 1,4-butanediol, 1,3-butanediol, 3-methyl-1,3-butanediol, 1,5-pentanediol, 3-methyl 1,5-pentanediol, neopentyl glycol, 1,6-hexanediol, 1,4-bis(hydroxymethyl)cyclohexane, and 2,2,4-trimethyl-1,3-pentanediol;
  ether glycols such as polyoxyethylene glycol and polyoxypropylene glycol;
  modified polyether diols obtained by ring-opening polymerization of the aliphatic diols and various cyclic ether bond-containing compounds such as ethylene oxide, propylene oxide, tetrahydrofuran, ethyl glycidyl ether, propyl glycidyl ether, butyl glycidyl ether, phenyl glycidyl ether, and allyl glycidyl ether;
  lactone-based polyester polyols obtained by a polycondensation reaction between the aliphatic diols and various lactones such as lactide and ε-caprolactone;
  bisphenols such as bisphenol A and bisphenol F;
  alkylene oxide adducts of bisphenols obtained by adding ethylene oxide, propylene oxide, and the like to a bisphenol such as bisphenol A and bisphenol F;
  aliphatic polyols such as trimethylolethane, trimethylolpropane, glycerin, hexanetriol, and pentaerythritol;
  modified polyether polyols obtained by ring-opening polymerization of the aliphatic polyols and various cyclic ether bond-containing compounds such as ethylene oxide, propylene oxide, tetrahydrofuran, ethyl glycidyl ether, propyl glycidyl ether, butyl glycidyl ether, phenyl glycidyl ether, and allyl glycidyl ether; and
  lactone-based polyester polyols obtained by a polycondensation reaction between the aliphatic polyols and various lactones such as ε-caprolactone.

It is preferred that the polyhydric alcohol contains 1,6-hexanediol because of being capable of forming a heat seal layer with excellent heat and moisture heat resistance. It is preferred that the amount of 1,6-hexanediol blended in the polyhydric alcohol be 70% by mass or more.

Neopentyl glycol is also preferably used because of being expected to reduce the crystallinity of polyester polyol (A). The amount of neopentyl glycol blended in the polyhydric alcohol is 3% by mass or more and 30% by mass or less.

Polyester polyol (A) may be a polyester polyurethane polyol, which is a reaction product of a composition containing polyisocyanate in addition to the polyvalent carboxylic acids and polyhydric alcohols mentioned above. Alternatively, polyester polyol (A) may be a polyester polyurethane polyol obtained by urethane elongation, with polyisocyanates, of the reaction products of polyvalent carboxylic acids and polyhydric alcohols described above. The polyisocyanate used in this case is not particularly limited, and any conventionally known polyisocyanate can be used, either singly or in combination with two or more.

Examples of polyisocyanates include: aromatic diisocyanates such as 2,2'-diphenylmethane diisocyanate, 2,4'-diphenylmethane diisocyanate, 4,4'-diphenylmethane diisocyanate, a polymethylene polyphenyl polyisocyanate (also known as polypeptide MDI or crude MDI), 1,3-phenylene diisocyanate, 4,4'-diphenyl diisocyanate, 1,4-phenylene diisocyanate, 2,4-tolylene diisocyanate, 2,6-tolylene diisocyanate, 4,4'-toluidine diisocyanate, 2,4,6-triisocyanate toluene, 1,3,5-triisocyanate benzene, dianisidine diisocyanate, 4,4'-diphenyl ether diisocyanate, and 4,4',4"-triphenylmethane triisocyanate;
  aromatic aliphatic diisocyanate (aliphatic isocyanate having one or more aromatic rings in the molecule) such as m- or p-xylylene diisocyanate (also known as XDI), and α,α,α',α'-tetramethylxylylene diisocyanate (also known as TMXDI);

aliphatic diisocyanate such as trimethylene diisocyanate, tetramethylene diisocyanate, hexamethylene diisocyanate (also known as HDI), pentamethylene diisocyanate, 1,2-propylene diisocyanate, 2,3-butylene diisocyanate, 1,3-buylene diisocyanate, dodecamethylene diisocyanate, and 2,4,4-trimethylhexamethylene diisocyanate;

alicyclic diisocyanate such as 3-isocyanate methyl-3,5,5-trimethylcyclohexylisocyanate, isophorone diisocyanate (also known as IPDI), 1,3-cyclopentane diisocyanate, 1,3-cyclohexanediisocyanate, 1,4-cyclohexanediisocyanate, methyl-2,4-cyclohexanediisocyanate, methyl-2,6-cyclohexanediisocyanate, 4,4'-methylenebis(cyclohexylisocyanate), and 1,4-bis(isocyanatemethyl)cyclohexane;

biuret, nurate, adduct, allophanate, carbodiimide denatured, uretdione denatured of these diisocyanates, and urethane prepolymers obtained by reacting these polyisocyanates with polyols.

The number average molecular weight (Mn) of polyester polyol (A) ranges from 2,000 to 30,000, preferably 3,000 to 15,000, and more preferably 4,000 to 12,000. With the number average molecular weight in this range, the cured coating film of the heat sealant can retain moderate flexibility and form a heat seal layer with excellent heat sealability. In addition, the viscosity of the heat sealant is not too high, resulting in good coating performance.

In the present invention, the number average molecular weight (Mn) is the value measured by gel permeation chromatography (GPC) under the following conditions.

Measuring equipment: HLC-8320GPC manufactured by Tosoh Corporation
Columns: Tosoh Corporation TSKgel 4000HXL, TSKgel 3000HXL, TSKgel 2000HXL, TSKgel 1000HXL
Detector: RI (differential refractometer)
Data processing: Tosoh Corporation's MultiStation GPC-8020modelII
Measuring conditions: column temperature 40° C.
Solvent Tetrahydrofuran
Flow rate 0.35 ml/min
Standard: Monodispersed polystyrene
Sample: 0.2% by mass of tetrahydrofuran solution in terms of resin solids, filtered through a microfilter (100 μl)

The hydroxy group value of polyester polyol (A) is preferably in the range of 1 to 40 mgKOH/g, more preferably 3 mgKOH/g or more and 30 mgKOH/g or less, because of the superior adhesive strength.

The solid acid number of polyester polyol (A) is not particularly limited, but preferably 10.0 mgKOH/g or less. When the solid acid number of polyester polyol (A) is 5.0 mgKOH/g or less, superior resistance to heat and humidity is achieved, which is preferable. There is no limitation on the lower limit of solid acid number, but as an example, 0.5 mgKOH/g or more. It may also be 0 mgKOH/g.

The amount of polyester polyol (A) in the solid content of the heat sealant is preferably 20% by mass or more and 95% by mass or less.

Conventionally known epoxy resins can be used as an epoxy resin (B) without limitation, and examples thereof include: bisphenol type epoxy resins such as bisphenol A type epoxy resins and bisphenol F type epoxy resins; biphenyl type epoxy resins such as biphenyl type epoxy resins and tetramethyl biphenyl type epoxy resins; and dicyclopentadiene-phenol addition reaction type epoxy resins. These may be used singly, or in combination of two or more. Among these, bisphenol epoxy resins are preferable because of having high adhesion to various base materials and being capable of forming a heat seal layer with excellent moisture and heat resistance.

The epoxy resin (B) preferably has a softening point of 150° C. or less as determined by the ring and ball method of JIS K 7234, and it is more preferable that the softening point is 60° C. or more and 100° C. or less.

The number average molecular weight (Mn) of the epoxy resin (B) is preferably in the range of 450 to 4,000, because of being capable of forming heat seal layer with high adhesion to various base materials and excellent moisture heat resistance. The epoxy equivalent is preferably in the range of 230 to 3,300 g/equivalent.

The amount of epoxy resin (B) blended in the solid content of the heat sealant is preferably 1% by mass or more and 30% by mass or less.

The isocyanate compound (C) is not particularly limited as long as it is a compound having two or more isocyanate groups in one molecule, and various compounds can be used. Specific examples of isocyanate compound (C) include the same polyisocyanates illustrated as raw materials for polyester polyol (A), and isocyanate compound (C) can be used singly or in combination of two or more.

Aromatic or aromatic aliphatic polyisocyanates or derivatives thereof are preferably used to control the permeation of fuel gases and water vapor generated during power generation.

The isocyanate compound (C) preferably has a ratio [NCO]/[OH] of 0.4 to 4.0 between the total number of moles of hydroxy groups [OH] in the heat sealant and the total number of moles of isocyanate groups [NCO] in the isocyanate compound (C), and more preferably 0.4 to 1.4. This allows the formation of a heat seal layer with excellent heat resistance and moisture heat resistance.

The heat sealant contains an organic solvent. The organic solvent dissolves the polyester polyol (A), the epoxy resin (B), and the isocyanate compound (C) to adjust a viscosity suitable for coating. Examples of the organic solvent include: esters such as ethyl acetate, butyl acetate, and cellosolve acetate; ketones such as acetone, methyl ethyl ketone, isobutyl ketone, and cyclohexanone; ethers such as tetrahydrofuran and dioxane; aromatic hydrocarbons such as toluene and xylene; halogenated hydrocarbons such as methylene chloride and ethylene chloride; dimethyl sulfoxide; and dimethyl sulfonamide.

The heat sealant may contain components other than amorphous polyester polyols (A), epoxy resins (B), and isocyanate compounds (C).

It is preferable that the heat sealant contains resin (D) having a glass transition temperature of 50° C. or more and 110° C. or more because of being capable of forming a heat seal layer with better moisture and heat resistance. The inclusion of the resin (D) also suppresses surface tack of the heat seal layer, which is described later, and provides excellent workability. The resin (D) can be used without limitation as long as its glass transition temperature is 50° C. or more and 110° C. or less. An example thereof includes a polyester resin, a polyurethane resin, a polyurea resin, an acrylic resin, a polyamide resin, a polyimide resin, an epoxy resin, and a rosin modified epoxy resin. Polyester resin (D1) is preferable.

The same polyvalent carboxylic acids and polyhydric alcohols used in the synthesis of polyester resins (D1) can be used as amorphous polyester polyols (A). It is preferable that the amount of aromatic polyvalent carboxylic acid blended in the polyvalent carboxylic acid is 95% by mass or more because of superior resistance to heat and moisture.

The number average molecular weight (Mn) of the polyester (D1) is preferably 3,000 to 100,000, more preferably 3,500 to 50,000, and most preferably 4,000 to 30,000. The weight average molecular weight (Mw) is preferably in the range of 5,000 to 300,000, more preferably 10,000 to 200,000.

When the resin (D) includes hydroxy groups, the hydroxy group value thereof is preferably in the range of 1 to 40 mgKOH/g, more preferably 3 mgKOH/g or more and 30 mgKOH/g or less. When the resin (D) includes carboxy groups, the solid acid number thereof is not particularly limited, but is preferably 10.0 mgKOH/g or less. When the solid acid number of polyester polyol (A) is 5.0 mgKOH/g or less, superior resistance to heat and humidity is achieved, which is preferable. There is no limitation on the lower limit of solid acid number, but as an example, 0.5 mgKOH/g or more.

The glass transition temperature of the resin (D) is more preferably 60° C. or more, and more preferably 65° C. or more. The glass transition temperature of the resin (D) is more preferably 100° C. or less, and more preferably 90° C. or less.

The amount of the resin (D) blended is not particularly limited, as it can be adjusted according to the degree of moisture and heat resistance required. However, too much amount of the resin (D) blended needs higher temperature of the heat seal, and therefore the amount of the resin (D) blended is preferably 90 parts by mass or less per total 100 parts by mass of the polyester polyol (A) and the resin (D). The amount is more preferably 3 parts by mass or more and 80 parts by mass or less, and more preferably 5 parts by mass or more and 65 parts by mass or less.

If initial tack is required for the heat seal layer, the heat sealant may contain an adhesive. Examples of the adhesive include rosin-based or rosin ester-based adhesives, terpene-based or terpene phenol-based adhesives, saturated hydrocarbon resin, coumarone-based adhesives, coumarone-indene-based adhesives, styrene resin-based adhesives, xylene resin-based adhesives, phenol resin-based adhesives, petroleum resin-based adhesives, and ketone resin-based adhesives. These may be used singly, or in combination of two or more.

Examples of the rosin-based or the rosin ester-based adhesives include polymerized rosins, disproportionated rosins, hydrogenated rosins, maleated rosins, fumarized rosins, glycerin esters thereof, pentaerythritol ester, methyl ester, ethyl ester, butyl ester, ethylene glycol ester, diethylene glycol ester, and triethylene glycol ester.

Examples of the terpene-based or the terpene phenol-based adhesives include low-polymerized terpene-based, α-pinene polymer, β-pinene polymer, terpene phenol-based, aromatic-modified terpene-based, and hydrogenated terpene-based adhesives.

As a phenolic resin, condensation products of phenols and formaldehyde can be used. Examples of the phenols include phenol, m-cresol, 3,5-xylenol, p-alkylphenol, and resorcin. Examples thereof include resols obtained from an addition reaction of these phenols and formaldehyde with an alkali catalyst, and novolaks obtained from a condensation reaction with an acid catalyst. In addition, examples thereof include rosin phenolic resins obtained by acid-catalyzed addition of phenol to rosins and thermal polymerization.

Examples of petroleum resins include: petroleum resins obtained by polymerizing a petroleum fraction with 5 carbon atoms obtained from pentene, pentadiene, isoprene, and the like; petroleum resins obtained by polymerizing a petroleum fraction with 9 carbon atoms obtained from indene, methyl indene, vinyltoluene, styrene, α-methylstyrene, and β-methylstyrene; C5-C9 copolymerized petroleum resins obtained from the various monomers; petroleum resins with hydrogenation of these; petroleum resins obtained from cyclopentadiene and dicyclopentadiene; those petroleum resin hydrides; and modified petroleum resins obtained by modifying these petroleum resins with maleic anhydride, maleic acid, fumaric acid, (meth)acrylic acid, phenol, and the like.

Ketone resins can be any known and customary ketone resins, but a formaldehyde resin, a cyclohexanone-formaldehyde resin, and a ketone aldehyde condensation resin can be suitably used.

Various types of the adhesive with various softening points can be obtained, but a ketone resin-based adhesive with a softening point of 70 to 160° C., and preferably 80 to 100° C. or a rosin-based resin and hydrogenated derivatives thereof with a softening point of 80 to 160° C., and preferably 90 to 110° C. is preferable, and a ketone resin-based adhesive with a softening point of 80 to 160° C., and preferably 90 to 110° C. is more preferable, in terms of compatibility, color tone, and thermal stability when mixed with the polyol ester polyol (A) and the epoxy resin (B). The ketone resin-based adhesive and hydrogenated rosin-based adhesive with an acid value of 2 to 20 mgKOH/g and a hydroxy group value of 10 mgKOH/g or less are preferable, and the ketone resin-based adhesive with an acid value of 2 to 20 mgKOH/g and a hydroxy group value of 10 mgKOH/g or less are more preferable.

When an adhesive is used, the amount of the adhesive blended is preferably 0.1 to 10% by mass of the solid content of the heat sealant.

It is also preferable for the heat sealant to contain inorganic fillers because the inorganic fillers can be expected to improve the cohesion as well as the water vapor barrier and gas barrier properties. Examples of inorganic fillers include silica, alumina, aluminum flakes, and glass flakes. The use of plate-like inorganic compounds is particularly preferable because of the improved gas barrier properties. Examples of the plate-like inorganic compound include hydrous silicate (phyllosilicate minerals, and the like), kaolinite-serpentine clay minerals (halloysite, kaolinite, enderite, dickite, nacrite, and the like, and antigorite, chrysotile, and the like), pyrophyllite-talc group (pyrophyllite, talc, kerolite, and the like), smectite clay minerals (montmorillonite, beidellite, nontronite, saponite, hectorite, sauconite, stevensite, and the like), vermiculite clay minerals (vermiculite, and the like), micas or mica clay minerals (micas such as muscovite and phlogopite, margarite, tetrasilicic mica, tainiolite, and the like), chlorites (cookeite, sudoite, clinochlore, chamosite, nimite, and the like), hydrotalcite, flake-shaped barium sulphate, boehmite, and aluminum polyphosphate. These minerals may be natural clay minerals or synthetic clay minerals. One or two or more of the plate-like inorganic compounds can be used together.

The plate-like inorganic compound may be ionic with charge between layers, or nonionic with no charge. The presence or absence of charge between layers has no direct significant effect on the gas barrier properties of the heat seal layer. However, ionic plate-like inorganic compounds and inorganic compounds that swell in water have poor dispersibility in organic solvents, and increasing the amount added may cause the heat sealant to thicken or become thixotropic, reducing the coating suitability. Therefore, the plate-like inorganic compound is preferably non-ionic with no interlayer electrification of the plate-like inorganic compound.

The average particle size of the plate-like inorganic compound is not limited, but as an example, preferably 0.1 µm or more, and more preferably 1 µm or more. If the average particle size is less than 0.1 µm, the bypass path for oxygen molecules is not lengthened, and the gas barrier property is not expected to be sufficiently improved. The upper limit of the average particle size is not limited, but if the particle diameter is too large, defects such as streaking may occur on the coated surface depending on the coating method. Therefore, as an example, the average particle size is preferably 100 µm or less and preferably 20 µm or less. In this description, the average particle size of a plate-like inorganic compound refers to the particle size that appears most frequently when the particle size distribution of the plate-shaped inorganic compound is measured using a light scattering measurement device.

Higher aspect ratios of the plate-like inorganic compound are preferable for improved gas barrier properties due to the oxygen labyrinth effect. Specifically, the aspect ratio is preferably 3 or more, more preferably 10 or more, and most preferably 40 or more.

When an inorganic filler agent is used, the amount of the inorganic filler agent blended is preferably 5 to 50% by mass of the solid content of the heat sealant, and more preferably 20 to 40% by mass.

The heat sealant may further contain other components such as lubricants such as waxes and fillers, defoamers, plasticizers, leveling agents, emulsifiers, dispersion stabilizers, surfactants, preservatives, antibacterial agents, rust inhibitors, antioxidants, curing catalysts, light stabilizers, UV absorbers, photocatalytic compounds, dyes, inorganic pigments, organic pigments, constituent pigments, and antistatic agents.

The laminate of the present invention includes a heat seal layer on a base material. The coating application method of the heat sealant is not particularly limited, and examples thereof include gravure coating, reverse coating, kiss coating, air knife coating, meyer bar coating, roll coating, and dip coating.

The heat sealant is applied on the base material, the solvent is dried, and then cured to form the heat seal layer. Drying temperature is 50 to 180° C., and drying time is 0.5 second to 1 minute. Drying methods are not particularly limited, but one example is hot air drying. Curing temperatures range from room temperature to 90° C. and curing times from 2 days to 2 weeks.

The amount of heat sealant applied (solid content) is not particularly limited, but as an example, 1.0 to 30.0 g/m². 5.0 to 25.0 g/m² is preferable, and 7.0 to 20.0 g/m² is more preferable.

<Gasket, Fuel Cell>

The laminate of the present invention is suitable for use as a gasket for a fuel cell. FIG. 1 is a schematic view of a fuel cell 11 in one embodiment of the present invention. As illustrated in FIG. 1, the fuel cell 11 has a cell with a membrane electrode junction 12 sandwiched between a pair of separators 10 and 10'. Cells may be in a stack structure with a plurality of cells stacked in series via separators 10 and 10'. The membrane electrode junction 12 has an electrolyte membrane 1, an anode electrode 2, a cathode electrode 3, gaskets 4,4', and gas diffusion layers 5,5'.

The electrolyte membrane 1 is not limited as long as it is made of a material with high ion conductivity, but most often a perfluorosulfonic acid-based or hydrocarbon-based solid polymer electrolyte membrane is used. Specifically, examples thereof include Nafion (registered trademark) by DuPont, Goreselect (registered trademark) by Gore Corporation of Japan, Flemion (registered trademark) by Asahi Glass Co. The thickness of the electrolyte film 10 is not particularly limited, but 10 µm to 200 µm is preferable. Thinner films are easily damaged and difficult to handle, while thicker films increase film resistance and cause performance problems.

Anode electrode 2 and cathode electrode 3 include a catalyst and an electrolyte. The catalyst is particles including: platinum group elements such as platinum, palladium, ruthenium, iridium, rhodium, and osmium; metals such as iron, lead, copper, chromium, cobalt, nickel, manganese, vanadium, molybdenum, gallium, and aluminum; and alloys, oxides, and compound oxides thereof. From the viewpoints of activity and stability, the particle size is preferably 0.5 nm or more and 20 nm or less.

Catalyst particles can be used by themselves, but it is preferable to support them on a conductive support. Carbon particles are generally used as the conductive support, but are not particularly limited as long as they are conductive and chemically resistant in a form of fine particles. Examples thereof include carbon black, graphite, activated carbon, carbon fibers, carbon nanotubes, and fullerenes. The carbon particles are preferably 10 to 1,000 nm in diameter. If they are smaller than such sizes, it is difficult to form an electron conduction path, and if they are larger than such sizes, the thickness of the anode electrode 2 and cathode electrode 3 increase, resulting in increased resistance.

The electrolyte used for the anode electrode 2 and the cathode electrode 3 can be any ion conductive material. The use of a material of the same quality as the electrolyte membrane 1 is preferable because of enhancing adhesion among the anode electrode 2, cathode electrode 3, and the electrolyte membrane 1.

The anode electrode 2 and cathode electrode 3 can be formed, for example, by wet-coating the electrolyte membrane 1 directly with a slurry containing a mixture of catalyst particles, conductive units, and the electrolyte, or by coating the transfer base material or gas diffusion layers 5 and 5' for subsequent transferring.

The solvent or dispersant of the slurry is not particularly limited, but may be capable of dissolving or dispersing the electrolyte. Examples thereof include water, alcohols (methanol, ethanol, 1-propanol, 2-propanol, 1-butanol, 2-butanol, 3-butanol, pentanol, ethylene glycol, diacetone alcohol, 1-methoxy-2-propanol, and the like), ketones (acetone, methyl ethyl ketone, pentanone, methyl isobutyl ketone, diisobutyl ketone, and the like), ethers (dioxane, tetrahydrofuran, and the like), sulfoxides (dimethyl sulfoxide), and amides (dimethylformamide, dimethylacetamide, and the like), and these can be used singly or in combination of two or more. Those that are easily removed by heating are preferable, especially those with a boiling point of 150° C. or less.

The formation of the anode electrode 2 and cathode electrode 3 is followed by a drying process as necessary. Drying methods are not particularly limited, and examples thereof include warm-air drying, infrared drying, and decompression drying.

The gas diffusion layers 5 and 5' are composed of gas-permeable and electron-conductive materials, and can be formed, for example, by metal materials such as foamed metal or metal mesh, or carbon materials such as carbon cloth or carbon paper.

The separators 10 and 10' are made of conductive and gas-impermeable materials, such as metal plates subjected to corrosion-resistant treatment or carbon-based materials such as calcined carbon. The separators 10 and 10' are formed with gas channels 8 and 8' for gas flow and cooling water channels 9 and 9' for cooling water flow on the main surfaces opposite the surfaces where the gas channels 8 and 8' are formed. The separators 10 and 10' are arranged adjacent to the gas diffusion layers 5 and 5'.

Fuel gas is supplied from the gas channel 8 of the separator 10 on the anode 6 side. The fuel gas is, for example, hydrogen gas. Oxidant gas is supplied from the gas flow path 8' of the separator 10' on the cathode 7 side. An oxygen-containing gas such as air is supplied as the oxidant gas.

Gaskets 4 and 4' are made of the laminate of the present invention and are frame-shaped. The gasket 4 is arranged between the electrolyte membrane 1 and the separator 10 such that the anode electrode 2 and the gas diffusion layer 5 are located in the opening of the gasket 4. The gasket 4' is arranged between the electrolyte membrane 1 and the separator 10' such that the cathode electrode 3 and the gas diffusion layer 5' are located in the opening of the gasket 4'. The gaskets 4 and 4' are bonded to the electrolyte membrane 1 via the heat seal layer described above.

The heat seal layer provided by the gaskets 4 and 4' of the present invention has excellent moisture and heat resistance, and therefore it is difficult to deteriorate under high temperature and high humidity conditions, as in fuel cells, and can stably prevent, over a long period, leakage of fuel gas and oxidant gas and intensive deterioration in areas where the catalyst layer is not formed.

EXAMPLES

The present invention will be described in more detail below with specific synthesis examples and examples, but the present invention is not limited to these examples. In the following examples, "part" and "%" represent "part by mass" and "% by mass," respectively, unless otherwise specified.

<Preparation of Heat Sealant>
(Synthesis of Polyester Polyol (A))

In a flask with a stir bar, a temperature sensor, and a rectification tube, 791 parts by weight of isophthalic acid (manufactured by Mitsubishi Gas Chemical Company, Inc.), 339 parts by weight of terephthalic acid (manufactured by Mitsui Chemicals, Inc.), 20 parts by weight of trimellitic acid anhydride (manufactured by Mitsubishi Gas Chemical Company, Inc.), 738 parts by weight of 1,6-hexanediol (manufactured by BASF), 107 parts by weight of neopentyl glycol (manufactured by Mitsubishi Gas Chemical Company, Inc.), and 4.0 parts by weight of an organic titanium compound ("Organix TC-100" manufactured by Matsumoto Fine Chemical Co., Ltd.) were charged, and dry nitrogen was flowed into the flask with stirring, and the temperature was raised to 240° C. while distilling off the generated water. The esterification reaction was then performed while increasing the vacuum degree to 30 torr, and the reaction was stopped when the resin acid value was 1.50 mgKOH/g or less to obtain a polyester polyol (A). The polyester polyol (A) had a number average molecular weight (Mn) of 7,000, a weight average molecular weight (Mw) of 23,500, a solid hydroxy value of 22.4 mgKOH/g, a solid acid value of 1.26 mgKOH/g, and a glass transition temperature (Tg) of 2.1° C. The polyester polyol (A) was diluted with ethyl acetate.

(Synthesis of Polyester Polyol (AH))

In a flask with a stir bar, a temperature sensor, and a rectification tube, 310 parts by weight of sebacic acid, 420 parts by weight of isophthalic acid, 212 parts by weight of phthalic anhydride, 11.1 parts by weight of trimellitic acid anhydride, 610 parts by weight of neopentyl glycol, and 0.7 part by weight of an organic titanium compound were charged, and dry nitrogen was flowed into the flask while stirring, and the temperature was raised to 240° C. while distilling off the generated water. The esterification reaction was then performed while increasing the vacuum to 30 torr, and the reaction was stopped when the acid value was 2.00 mgKOH/g or less to obtain polyester polyol (AH). The polyester polyol (AH) had a number average molecular weight (Mn) of 6,000, a weight average molecular weight (Mw) of 17,000, a solid hydroxy value of 14.6 mgKOH/g, a solid acid value of 1.94 mgKOH/g, and a glass transition temperature (Tg) of 6.0° C. Polyester polyol (AH) was diluted with ethyl acetate.

(Synthesis of Polyester (D1))

A polyester polyol was obtained according to the standard method using 697.2 parts of terephthalic acid, 72.9 parts of ethylene glycol, and 229.9 parts of 1,2-propylene glycol. The resulting polyester polyol was diluted with methyl ethyl ketone to 30% resin solids to obtain polyester (D1) with a number average molecular weight (Mn) of 8,400, a weight average molecular weight (Mw) of 61,300, a resin hydroxy number (in terms of solids) of 5.0 mgKOH/g, a resin acid number (in terms of solids) of 4.0 mgKOH/g, and a glass transition temperature of 84° C.

(Preparation of Heat Sealant)

Heat sealants for the examples and comparative examples were prepared by blending a polyester polyol (A), an epoxy resin (B), an isocyanate compound (C), and a polyester (D1) synthesized above in the proportions listed in Table 1. All values in the table are in terms of solids (or non-volatile). The details of the components in the table are as follows.

Epoxy resin B-1: JER1001 (Bisphenol A epoxy resin manufactured by Mitsubishi Chemical Corporation; epoxy equivalent weight: 450 to 500; softening point: 64° C.; number average molecular weight: 900)

Epoxy resin B-2: JER1004 (Bisphenol A epoxy resin manufactured by Mitsubishi Chemical Corporation; epoxy equivalent weight: 875 to 975; softening point: 97° C.; number average molecular weight: 1,650)

Isocyanate compound (C): Takenate D-110N (trimethylolpropane adduct of xylylene diisocyanate, manufactured by Mitsui Takeda Chemical Co.)

<Production of Laminate>

The prepared heat sealant was applied to a polyethylene terephthalate film (Toyobo, E5102) with a film thickness of 25 μm at 10 g/m². After the solvent was volatilized, the film was aged at 60° C. for 3 days to obtain laminates for the examples and comparative examples. Polyethylene terephthalate (Toyobo, E5102) with a film thickness of 25 μm was overlaid on the heat seal surface of the produced laminate and heat-sealed using a heating roller at 120° C., 2.0 MPa, 15 seconds for Examples 1 and 2 and Comparative Examples 1 and 2 to obtain test pieces. For Example 3, the test piece was heat-sealed at 150° C., 0.4 MPa, and 30 seconds.

<Evaluation>
(Heat Seal Strength)

The sample width was 15 mm, the 180° peel strength was measured at a tensile speed of 300 mm/min, and the results are summarized in Table 1. The unit is N/15 mm.

(Moisture and Heat Resistance)

After immersing the test piece in hot water at 85° C. for 500 hours, the heat seal strength was measured in the same manner as above, and the results are summarized in Table 1.

TABLE 1

|  | Example 1 | Example 2 | Example 3 | Comparative Example 1 | Comparative Example 2 |
|---|---|---|---|---|---|
| Polyester polyol (A) | 100.0 | 100.0 | 50.0 | 100.0 | |
| Polyester polyol (AH) | | | | | 100.0 |
| Epoxy resin (B-1) | 25.0 | | 25.0 | | |
| Epoxy resin (B-2) | | 25.0 | | | |
| Isocyanate compound (C) | 8.0 | 8.0 | 4.0 | 8.0 | 4.2 |
| Polyester (D1) | | | 50.0 | | |
| [NCO]/[OH] | 0.88 | 0.88 | 0.71 | 0.88 | 0.88 |
| Heat seal strength | 4.5 | 2.5 | 0.8* | 3.4 | 12.0 |
| Moisture and heat resistance | 8.9 | 7.5 | PET rupture | 5.6 | 1.7 |

What is claimed is:

1. A laminate comprising a base material and a heat seal layer arranged on the base material, wherein
the heat seal layer is a reaction product of a heat sealant containing an amorphous polyester polyol (A), an epoxy resin (B), and an isocyanate compound (C),
the amorphous polyester polyol (A) is a reaction product of a polyvalent carboxylic acid and a polyhydric alcohol,
an amount of aromatic polyvalent carboxylic acid in the polyvalent carboxylic acid is 95% by mass or more, and a glass transition temperature of the amorphous polyester polyol (A) is −20° C. or more and 40° C. or less.

2. The laminate according to claim 1, wherein an amount of terephthalic acid in the polyvalent carboxylic acid is 60% by mass or less and an amount of isophthalic acid in the polyvalent carboxylic acid is 40% by mass or more.

3. The laminate according to claim 1, wherein the polyhydric alcohol contains 1,6-hexanediol and an amount of the 1,6-hexanediol in the polyhydric alcohol is 70% by mass or more.

4. The laminate according to claim 1, wherein an amount of the amorphous polyester polyol (A) in a non-volatile content of the heat sealant is 20% by mass or more and 95% by mass or less.

5. The laminate according to claim 1, wherein a softening point of the epoxy resin (B) is 60° C. or more and 150° C. or less.

6. The laminate according to claim 1, wherein an amount of the epoxy resin (B) in a non-volatile content of the heat sealant is 1% by mass or more and 30% by mass or less.

7. The laminate according to claim 1, wherein the isocyanate compound (C) is an isocyanate compound having an aromatic ring.

8. The laminate according to claim 1, wherein a ratio [NCO]/[OH] of a total number of moles of isocyanate groups [NCO] in the isocyanate compound (C) to a total number of moles of hydroxy groups [OH] in the heat sealant is 0.4 to 4.0.

9. The laminate according to claim 1, wherein the base material is polyethylene naphthalate.

10. The laminate according to claim 1, wherein the base material is polyimide.

11. A gasket for a fuel cell, the gasket comprising the laminate according to claim 1.

12. A fuel cell comprising the gasket according to claim 11.

* * * * *